United States Patent
Kozak et al.

[19]

[11] Patent Number: 6,106,197

[45] Date of Patent: Aug. 22, 2000

[54] LANDFILL GARBAGE MANAGEMENT PROCESS

[76] Inventors: Stanley M. Kozak, Box 22, Site 195; William M. Kozak, Box 23, Site 195, both of Brandon, Manitoba, Canada, R7A 5Y1; Murray L. Kozak, Box 26, Carroll, Manitoba, Canada, R0K 0K0

[21] Appl. No.: 09/158,081

[22] Filed: Sep. 22, 1998

[30] Foreign Application Priority Data

Sep. 22, 1997 [CA] Canada ................................ 2216024

[51] Int. Cl.[7] ................................ B09B 1/00; G21F 9/00
[52] U.S. Cl. .......................... 405/128; 405/129; 241/24; 241/DIG. 38
[58] Field of Search .................... 405/128, 129; 241/DIG. 38, 22, 24; 210/170, 747

[56] References Cited

U.S. PATENT DOCUMENTS

| | | | |
|---|---|---|---|
| 3,533,775 | 10/1970 | Brown | 71/9 |
| 3,922,975 | 12/1975 | Reese | 110/216 |
| 4,079,837 | 3/1978 | Grube et al. | 241/DIG. 38 X |
| 4,252,462 | 2/1981 | Klingle et al. | 405/129 |
| 4,335,978 | 6/1982 | Mutch | 405/129 |
| 4,540,467 | 9/1985 | Grube et al. | 162/4 |
| 4,592,846 | 6/1986 | Metzger et al. | 405/129 X |
| 5,024,770 | 6/1991 | Boyd et al. | 241/24 X |
| 5,244,492 | 9/1993 | Cyr | 405/128 X |
| 5,356,452 | 10/1994 | Fahey | 405/128 X |
| 5,599,138 | 2/1997 | Kozak et al. | 405/129 |
| 5,624,205 | 4/1997 | Caropolo | 405/129 |
| 5,820,298 | 10/1998 | Dzierzbicki | 405/129 |

*Primary Examiner*—Eileen Dunn Lillis
*Assistant Examiner*—Jong-Suk Lee
*Attorney, Agent, or Firm*—Adrian D. Battison; Murray E. Thrift

[57] ABSTRACT

A process for reducing waste material for use with household and other landfill waste material at a landfill waste management site is described. The process reduces the volume of waste material in the landfill site, prevents contamination of the ground soil, allows for the natural breakdown of the organic components of the waste material and allows for the recycling of some or all of the waste material.

5 Claims, 3 Drawing Sheets

LANDFILL GARBAGE MANAGEMENT PROCESS

The present invention relates to a process for waste reduction for use with household and other landfill waste material at a landfill waste management site.

BACKGROUND OF THE INVENTION

The problem of disposing of waste materials particularly waste material of the type that is generally deposited at a landfill waste management site has become more acute. Typically, this waste material is household garbage and non-toxic industrial and commercial waste such as wood, concrete paper, food, glass, metals and old furniture. These waste materials are collected and transported by truck or barge to a landfill site. Once at the landfill site, the waste materials may be segregated somewhat to remove large metal objects, concrete and the like from the rest of the material. The remainder of the waste material is then usually simply covered over with earth and buried. In some locations, where burning is allowed, those items which may be burned are and the rest of the waste material is buried.

Many landfill sites are presently experiencing the problem of having to deal with too much waste material too quickly and are running out of available land to do so. As well, the current method of simply burying the waste material under a layer of earth does not lead to the natural breakdown of the organic component of the waste. This contributes to the problem of land usage since land previously used for landfill cannot be reused in a reasonable length of time. This can result in increased costs due to the need to purchase additional land as the landfill becomes full. Furthermore, if the waste material contains heavy metals, there is considerable risk that these compounds will seep out of the landfill and contaminate the soil and nearby water supplies.

The burning of some of the waste can help reduce the amount of waste material in a landfill site but this is prohibited by law in many places where air quality is a concern. Furthermore, any of the waste material that is burned cannot be recycled.

A process for reducing waste material at a landfill waste management site is needed which reduces the volume of waste material in the landfill site, prevents contamination of the ground soil, allows for the natural breakdown of the organic components of the waste material and which allows for the recycling of some or all of the waste material.

SUMMARY OF THE INVENTION

It is one object of the invention, therefore, to provide a process for reducing waste material at a landfill waste management site which reduces the volume of waste material in the landfill site, prevents contamination of the ground soil, allows for the natural breakdown of the organic components of the waste material and which allows for the recycling of some or all of the waste material.

According to a first aspect of the invention, there is provided a process for waste reduction of household and other landfill waste material at a landfill waste management site comprising:

grinding of waste materials thereby reducing a volume of the waste material after grinding;

placing the waste material in a holding cell arranged to accept the waste material after grinding, said holding cell including an impermeable floor;

composting of the waste material in the holding cell thereby reducing organic material in said waste material to humus; and accelerating composting by adding water to the waste material during composting, wherein the impermeable floor of the holding cell prevents contamination of the ground soil. In this manner, the impermeable floor forms a barrier between the waste material and the ground soil.

The impermeable floor may be comprised of clay or asphalt.

Preferably, the process includes creating a leachate by adding sufficient water to the waste material to remove heavy metals and other contaminants from the humus. The leachate may be channeled by providing a trench to a reservoir. The reservoir may comprise a storage pond connected to the trench. The added waster causes heavy metals present in the waste material to diffuse into the added water, thereby forming a leachate. The contaminated water or leachate then flows to the reservoir, which is also composed of an impermeable material such as clay or asphalt. In this manner, hazardous compounds are removed from the waste material during the composting action. Furthermore, as the floor of the holding cell is impermeable, there is virtually no risk of the leachate contaminating the ground soil.

Composting-enhancing bacteria may be added, preferably during grinding.

Preferably, most of the glass, metals, concrete and other dense non-grindable materials is segregated from the rest of the waste material prior to grinding. Plastics and light materials may be separated and removed from the humus. A magnet may be used to remove any metals from the humus.

Preferably, the holding cell includes side walls. Furthermore, the impermeable floor may be sloped so as to promote channeling of the leachate.

More preferably, sludge separated from a sewage treatment system is added to the waste material during composting.

The addition of the sludge from the sewage separation system during the composting action acts in a synergistic manner to enhance the composting action while disposing of the sludge. Instead of what would normally be expected to increase the noxious and unacceptable effect of the composting action, the addition of the sludge enhances the action and improves the breakdown of the waste material to humus. The sludge is taken from conventional sewage treatment systems which generally include either a lagoon or settling tanks for decanting liquid from the sewage materials fed to the treatment plant. Normally, it is necessary to decant the liquid and periodically extract the sludge. Conventionally, the sludge is discarded by spreading the sludge across agricultural land. This is of course undesirable and can lead to noxious fumes and odour. To the contrary, the addition of the sludge to the composting action of the present invention carries into the composting action additional bacteria to carry out the composting action and generates a mixture of materials which can rapidly decay in the composting action to form the environmentally acceptable humus. The sludge can be transported in relatively solid form by conventional trucking systems and loading systems. Alternatively, the sludge may be maintained in a more liquid state by the addition or maintenance of a higher liquid content so that the sludge can be pumped from the original site, transported in tanker trucks and pumped into the holding cell. The release of undesirable odours from the composting action can be controlled by a proper balance of the sludge content relative to the waste material content, by location of the holding cell in a suitable position to avoid interfering with local residents and by maintenance of the conditions to ensure aerobic bacterial activity. When the sludge is in more liquid form, the sludge can act to provide the water content necessary to maintain the proper balance for bacterial action in the waste material.

DETAILED DESCRIPTION

Figure 1:
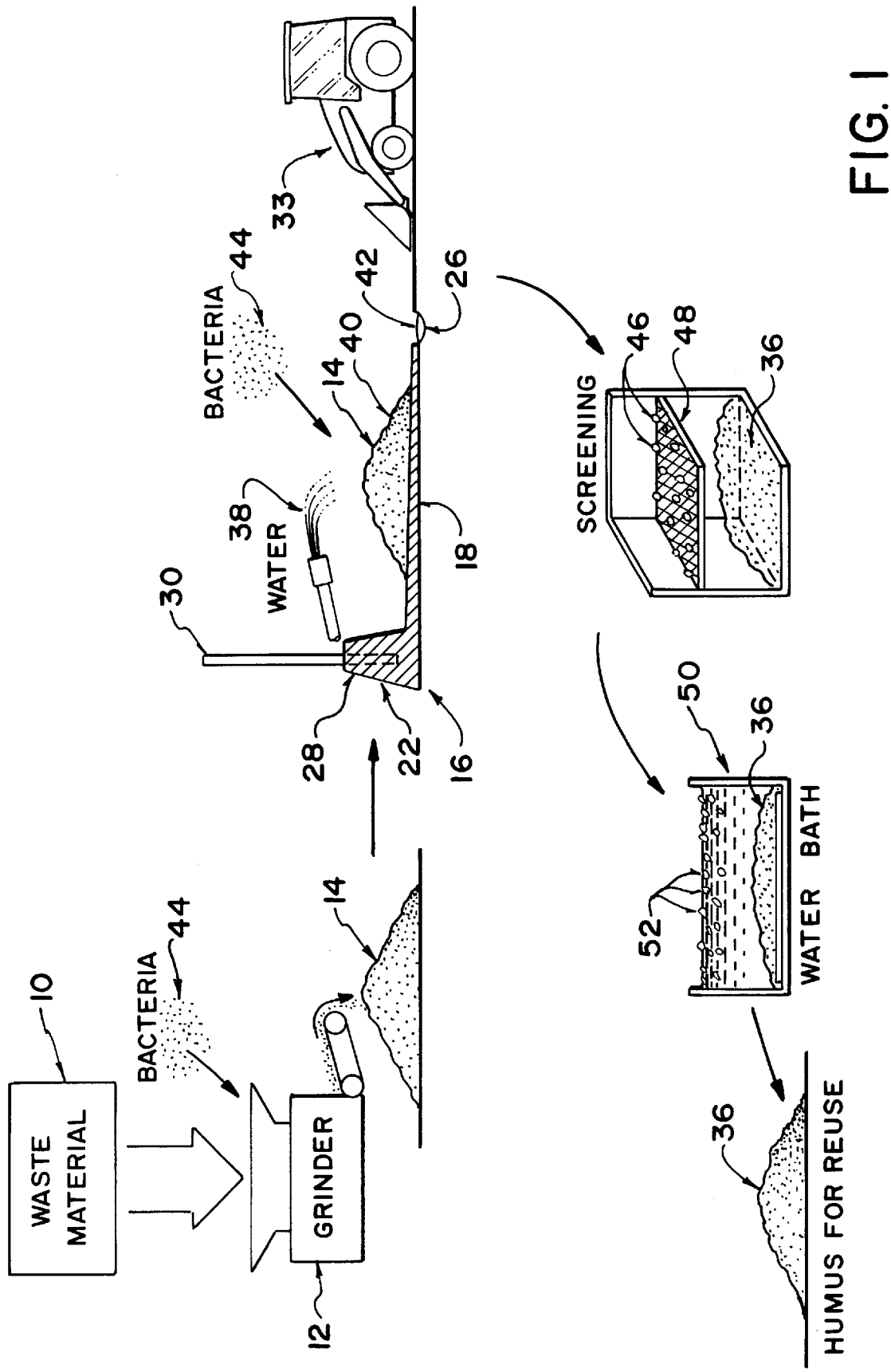
FIG. 1 is a schematic diagram of the entire process.

Referring to FIG. 1, the steps for the process of waste reduction for use with household and other landfill waste material at a landfill waste management site are shown schematically.

Waste material 10 is trucked or otherwise transported to a landfill site for disposal. The waste material 10 is segregated in the landfill prior to grinding to keep material which the grinder may not be able to process separate from the material to be ground up. This includes items such as glass, concrete, metals and other dense non-grindable materials. Small quantities of glass, small pieces of concrete as well as small and thin pieces of metal such as tin cans, nut bolts and nails may be left in the waste material 10 to be ground up, although the more of this type of material that may be separated before grinding the better. Sorting and segregation of the waste material 10 can also be performed before garbage collection but this is not required.

The first step in the process is grinding of the waste materials 10. This is done by transporting and loading the materials usually by means of a front end loader or other heavy equipment into an appropriate heavy duty grinding means 12 usually including a hopper and a grinding mechanism. The grinding means 12 grind the waste material 10 into small pieces and deposits the ground-up waste material 14 in a pile. Grinding the waste material reduces the volume of the waste material 10 significantly and makes the next step of composting occur much more efficiently. The volume reduction will depend upon the degree of grinding but a reduction in the order of 8 to 1 is known to be achievable. This in itself is a significant improvement over the current practice of simply piling up and burying the waste material.

Figure 2:
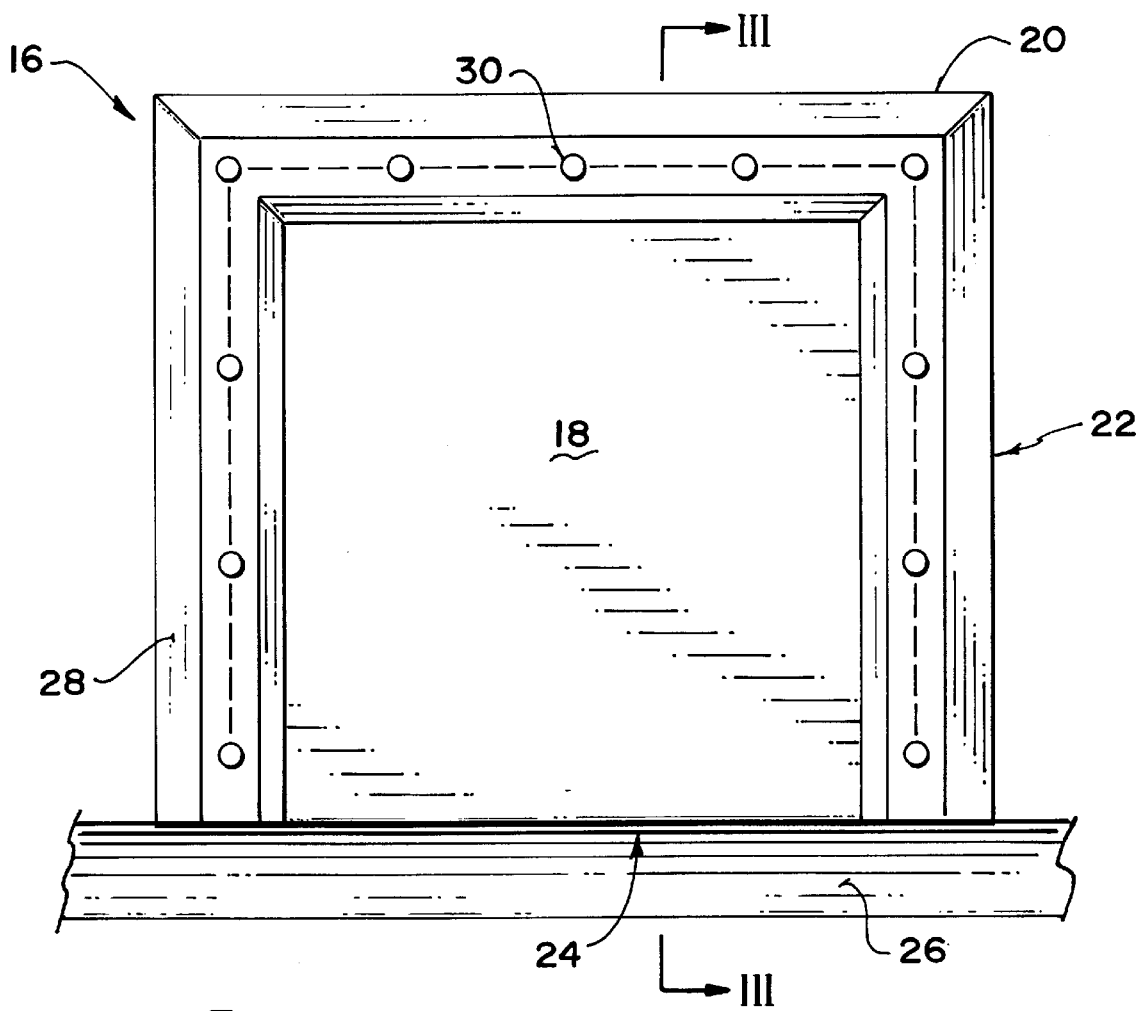
FIG. 2 is a top plan view of the holding cell.
Figure 3:
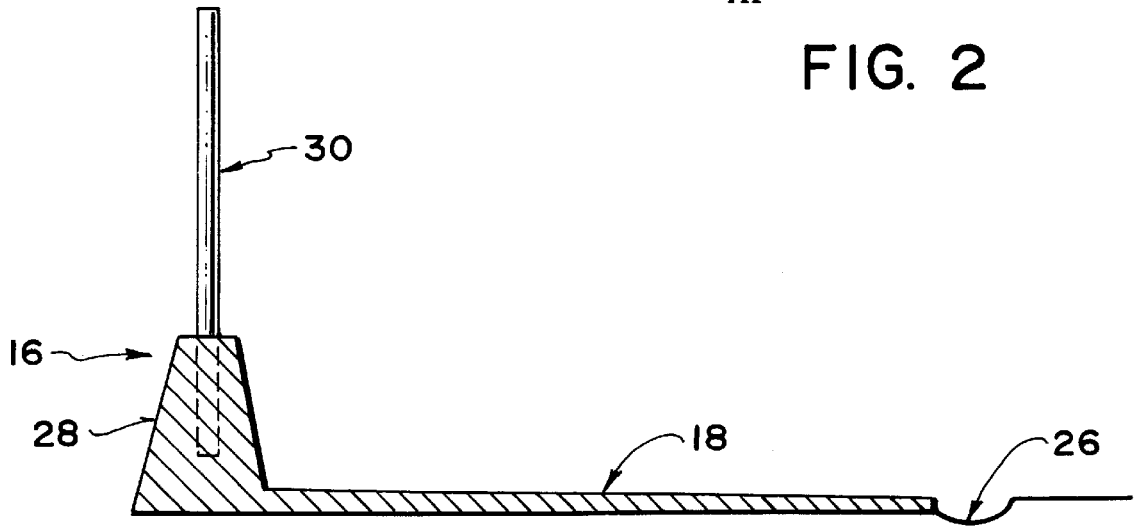
FIG. 3 is a side view in cross-section III—III of the holding cell shown in FIG. 2.

After grinding, the ground-up waste material 14 is transported and placed in a holding cell 16 by means of a front end loader, bulldozer or other heavy equipment 33. The details of the holding cell 16 are shown in FIGS. 2 and 3. The holding cell 16 comprises an impermeable floor 18 so that heavy metals and the like present in the ground-up waste material 14 will be retained in the holding cell 16 and will not contaminate the ground soil. The impermeable floor 18 has edges 20 and is constructed of a suitably impervious material such as clay or asphalt. In this embodiment, the holding cell 16 further comprises three side walls 22, one open side 24 and a trench 26 adjacent to the open side 24. Of note is that in this embodiment, the holding cell 16 is located above ground and the impermeable floor 18 is sloped in a downward direction toward the trench 26 as described below. The side walls 22 comprise a berm portion 28 and a fence portion 30. The berm portion 28 is composed of an impermeable material and extends laterally upward from the edges 20 of the impermeable floor 18. The berm portion 28 is arranged to form a barrier to retain the ground up waste material 14 within the holding cell 16. In this embodiment, the berm portion 28 is approximately 3 to 4 feet high. The fence portion 30 extends laterally upward from the berm portion and acts as a barrier to unauthorized individuals. The open side 24 provides access to the holding cell 16 for front end loaders, bulldozers and other heavy equipment. As noted above, the trench 26 is adjacent to the open side 24 of the holding cell 16 and the impermeable floor 18 is sloped in a downward direction toward the trench 26. The trench 26 includes ends 32 that extend beyond the edges 20 of the open side 24 of the holding cell 16. Furthermore, the ends 32 of the trench 26 are connected to holding ponds 34. Of note is that the holding ponds 34 are also composed of an impermeable material such as clay or asphalt.

The next step of the process is to allow composting of the ground up waste material 14 which reduces the organic portions of the ground-up waste material 14 to humus 36. By reducing the organic material to humus 36, a further gain in land usage is achieved since the humus 36 fills less volume than the ground-up waste material 14 and much less volume than the raw waste material 10. The composting process will, for the most part, take place naturally if the proper balance of conditions are maintained in the holding cell 16 for reducing the organic portion of the ground up waste material 14 to usable humus 36. For composting to take place, the right balance of moisture, availability of oxygen and the presence of the right type of microorganism is essential. The current practice in landfill sites of creating large piles of unground materials, compressing the piles with heavy equipment and covering the piles with soil prevents composting from occurring except at a very slow rate. By first grinding and composting the ground up waste material 14 in large holding cells 16, the composting process is significantly enhanced and speeded up.

To further enhance the composting of the ground up waste material 14 and help maintain the proper balance during composting, water 38 is added to the ground up waste material 14 periodically. The added water 38 will also remove heavy metals 40 present in the ground up waste material 14. Specifically, the heavy metals 40 diffuse into the added water 38, thereby forming a leachate 42. As noted above, the floor 18 of the holding cell 16 is impermeable and sloped towards the trench 26. As a result of this arrangement, the leachate 42 will flow along the impermeable floor 18 toward the trench 26. Furthermore, the berm portion 28 of the holding cell 16 forms a barrier that prevents the leachate 42 from flowing in any other direction. Once in the trench 26, the leachate 42 flows to the holding ponds 34 and is stored therein. In this manner, hazardous compounds are removed from the ground up waste material 14 during the composting action and stored. The end result is that the humus 38 is purified of some contaminants. Furthermore, as the floor 18 of the holding cell 16 and the holding ponds 34 are impermeable, there is virtually no risk of soil contamination. In addition to the added water 38, composting bacteria 44 over and above those already naturally present are added to the-ground up waste material 14. The compost-enhancing bacteria 44 may be added to the ground-up waste material 14 either during the grinding process or after grinding when the ground up waste material 14 is in the holding cell 16.

In addition to the provision of the compost enhancing bacteria 44 or as an alternative to the compost enhancing bacteria 44, sludge may be introduced into the holding cell as a mixture with the waste material for the composting action. The sludge is obtained from conventional settling tanks of a conventional sewage system and are transported by loading techniques to the pit for admixture with the waste materials in the required balanced amounts to enhance the bacterial action during composting.

Referring to FIG. 1, the next step in the process is the removal of the ground up waste material 14 from the holding cell 16 after composting. Again, this is done usually by means of a front end loader, bulldozer or other heavy equipment. At this point, all of the organic material in the ground up waste material 14 has been reduced to humus 36.

The next step in the process is screening of the waste material after composting which is now humus 36 and inorganic materials 46 to further clean the humus 36. As described above, heavy metals 40 and the like have previously been removed from the humus. Screening is performed by screening means 48 which usually includes a hopper, one or more screens of varying sizes and a means for passing the humus 36 and inorganic material 46 through the screen. The humus 36 and inorganic material 46 is loaded into the screening means 48 usually by means of a front end loader, a bulldozer or other heavy equipment. The screening means 48 removes any glass, metals, concrete or other dense materials which were present in the ground-up waste material 14 from the humus 36. These materials may be separated and stored for recycling or may simply be buried at the landfill.

After screening, the humus 36 and any remaining inorganic material 48 that passed through the screening means 48 is transported to a water bath 50 for separating. The humus 36 and inorganic material 46 is transported to the water bath 50 usually by means of a front end loader, bulldozer or other heavy equipment. The water bath 50 preferably includes a magnet to remove any metals which passed through the screening process. Furthermore, light materials 52 such as plastics are separated since the humus 36 will sink in the water while the light materials 52 will float on or near the surface where they can be easily removed from the water bath 50.

Once the humus 36 has been passed through the water bath 50, it is removed, dried and then spread at the landfill site or sold for use at other locations.

Figure 4:
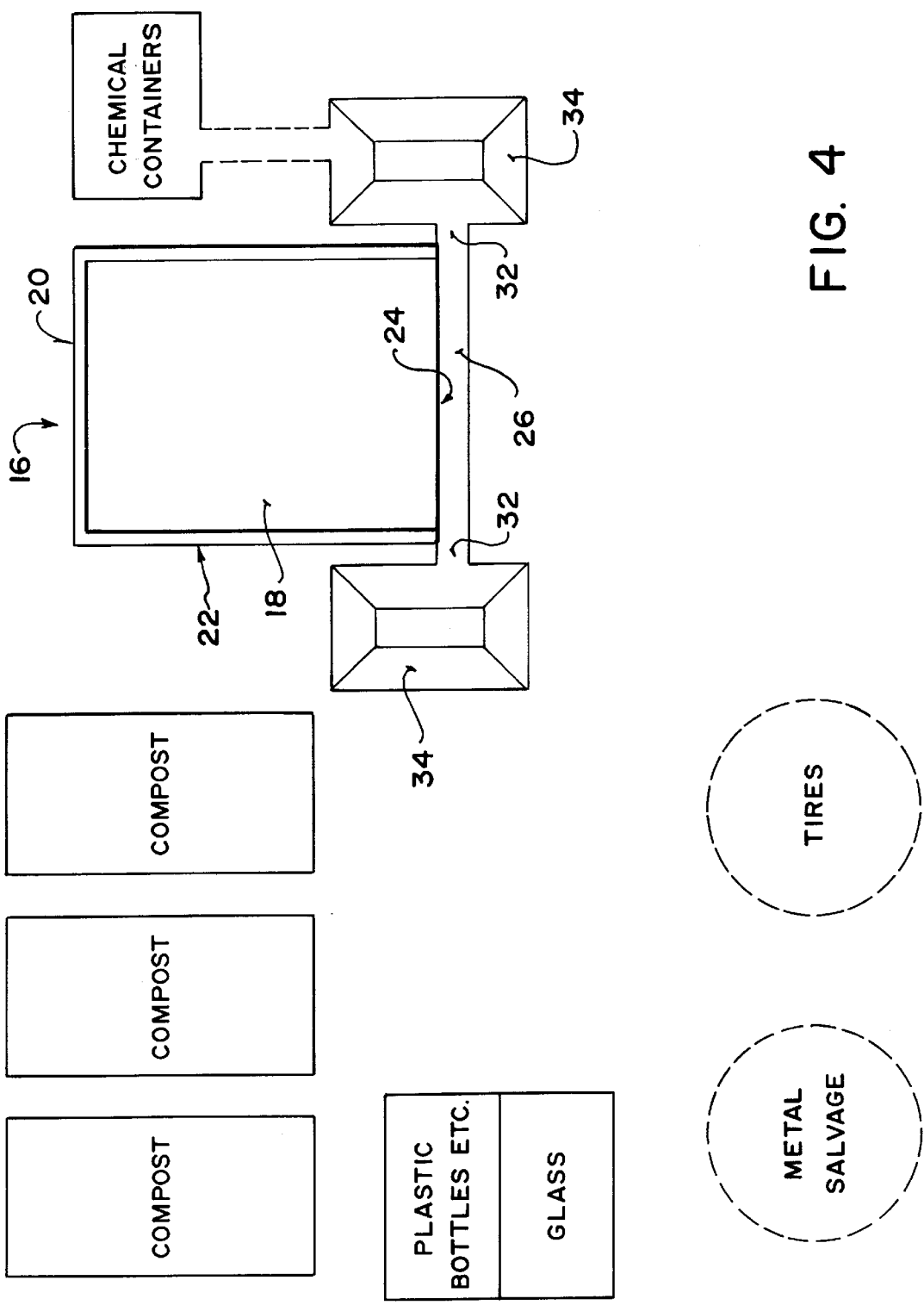
FIG. 4 is a schematic diagram of an arrangement of the waste management site.

Referring to FIG. 4, an arrangement of the components of the landfill waste management site is shown schematically. The holding cell 16 includes a trench 26 adjacent to the open side 24 of the holding cell 16 and holding ponds 34 are connected to the ends of the trench 26. Of note is that there are locations within the site arranged for the storage of recyclable materials such as plastics, glass, metal and tires. In addition, the landfill waste management site may include an impermeable holding cell for containers of toxic chemicals such as herbicides and the like.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A process for waste reduction of household and other landfill waste material at a landfill waste management site comprising the steps of:

grinding of the waste materials to produce ground-up waste material thereby reducing a volume of the waste material after the step of grinding;

providing an above-ground holding cell having three side walls, an open side for vehicular access, an impermeable floor sloped downwardly towards the open side and a trench extending from the open side to a reservoir;

driving a heavy machinery vehicle containing the ground-up waste material into the holding cell through the open side of the holding cell;

depositing the ground-up waste material in the heavy machinery vehicle onto the impermeable floor so that ground soil is not contaminated by the ground-up waste material;

composting the ground-up waste material in the holding cell thereby reducing organic material in said ground-up waste material to humus further comprising the steps of:

adding water to the ground-up waste material to accelerate the composting;

solubilizing heavy metals and other contaminants in the ground-up waste material into the added water, thereby forming a leachate; and channeling the leachate away from the ground-up waste material and into the trench; and using the heavy machinery vehicle to remove the humus from the holding cell via the open side of the holding cell.

2. The process according to claim 1 including adding composting-enhancing bacteria.

3. The process according to claim 2 wherein the composting-enhancing bacteria are added during the step of grinding.

4. The process according to claim 1 wherein segregation of most of glass, metals, concrete and other dense non-grindable materials from the rest of the waste material is conducted prior to the step of grinding.

5. The process according to claim 1 including separating and removing plastics and light materials from the humus.

* * * * *